United States Patent
Wu et al.

(10) Patent No.: US 10,282,464 B2
(45) Date of Patent: May 7, 2019

(54) DATA PROCESSING METHOD AND DEVICE FOR INTERNET ENTITY ANALYSIS

(71) Applicant: Beijing Gridsum Technology Co., Ltd., Beijing (CN)

(72) Inventors: Chong Wu, Beijing (CN); Yun Zhang, Beijing (CN); Huagui Lai, Beijing (CN); Jibin Yang, Beijing (CN); Yongjian Huang, Beijing (CN)

(73) Assignee: BEIJING GRIDSUM TECHNOLOGY CO., LTD., Beijing (CN)

( * ) Notice: Subject to any disclaimer, the term of this patent is extended or adjusted under 35 U.S.C. 154(b) by 503 days.

(21) Appl. No.: 14/910,597

(22) PCT Filed: Jul. 31, 2014

(86) PCT No.: PCT/CN2014/083454
§ 371 (c)(1),
(2) Date: Apr. 29, 2016

(87) PCT Pub. No.: WO2015/021868
PCT Pub. Date: Feb. 19, 2015

(65) Prior Publication Data
US 2016/0246872 A1 Aug. 25, 2016

(30) Foreign Application Priority Data
Aug. 15, 2013 (CN) .......................... 2013 1 0356952

(51) Int. Cl.
*G06F 7/00* (2006.01)
*G06F 17/30* (2006.01)
*G06Q 30/02* (2012.01)

(52) U.S. Cl.
CPC .. *G06F 17/30604* (2013.01); *G06F 17/30339* (2013.01); *G06F 17/30598* (2013.01); *G06Q 30/02* (2013.01)

(58) Field of Classification Search
CPC ......... G06F 17/30604; G06F 17/30339; G06F 17/30598; G06Q 30/02
See application file for complete search history.

(56) References Cited

U.S. PATENT DOCUMENTS

| | | | |
|---|---|---|---|
| 7,533,113 B1 * | 5/2009 | Haddad | G06Q 30/02 |
| 2005/0137939 A1 | 6/2005 | Calabria et al. | |
| 2014/0067768 A1 * | 3/2014 | Fateh | G06F 17/30312 |
| | | | 707/684 |

FOREIGN PATENT DOCUMENTS

| CN | 102 385 729 A | 3/2012 |
|---|---|---|
| CN | 102 592 235 A | 7/2012 |

(Continued)

OTHER PUBLICATIONS

International Search Report for Application No. PCT/CN2014/083454 dated Oct. 14, 2014.

(Continued)

*Primary Examiner* — Azam M Cheema
(74) *Attorney, Agent, or Firm* — Jenkins, Wilson, Taylor & Hunt, P.A.

(57) ABSTRACT

The present disclosure discloses a data processing method and device for Internet entity analysis. The data processing method includes: acquiring a first entity state and a second entity state; acquiring first indicator data and second indicator data, the first indicator data being indicator data of the first entity state and the second indicator data being indicator data of the second entity state; and acquiring a corresponding relationship between the entity state and the indicator data, the corresponding relationship including a first corresponding relationship and a second corresponding relation- (Continued)

ship, the first corresponding relationship being a corresponding relationship between the first entity state and the first indicator data and the second corresponding relationship being a corresponding relationship between the second entity state and the second indicator data. By the present disclosure, correspondence between the indicator data of the Internet entity and all historical states of the Internet entity is implemented.

10 Claims, 4 Drawing Sheets

(56) References Cited

FOREIGN PATENT DOCUMENTS

| CN | 103 150 663 A | 6/2013 |
| CN | 103 390 067 A | 11/2013 |

OTHER PUBLICATIONS

IPRP with Written Opinion for Application No. PCT/CN2014/083454 dated Feb. 16, 2016.

* cited by examiner

DATA PROCESSING METHOD AND DEVICE FOR INTERNET ENTITY ANALYSIS

TECHNICAL FIELD OF THE DISCLOSURE

The present disclosure relates to the field of data processing, and in particular to a data processing method and device for Internet entity analysis.

BACKGROUND OF THE DISCLOSURE

A client may obtain related indicator (such as display, cost and click) data of an Internet entity when delivering the Internet entity (such as an Internet advertisement and a network monitoring entity). The client may regulate an Internet entity delivery strategy in the future by analyzing historical data of a related indicator in a period of time. After the client regulates the Internet entity delivery strategy for many times, a state of the Internet entity may be changed for many times.

For obtaining related indicator data of an Internet entity, there is provided a solution in an existing technology, and in the solution, the indicator data may only correspond to the latest state of the Internet entity when the client analyzes all historical data of an indicator. As time goes by, such a data analysis result may get more and more inaccurate.

For example: if an Internet entity sequentially passes through three states S1, S2 and S3 in the history and indicator data corresponding to each state is K1, K2 and K3 respectively, according to the technical solution provided by the existing technology, the indicator data K1, K2 and K3 may not correspond to the states S1 and S2 of the Internet entity but only to the state S3 of the Internet entity when the client analyzes all the historical data of an indicator. Obviously, such a data processing manner is inaccurate.

For the problem of inaccuracy of an analysis result of indicator data of an Internet entity in a related technology, there is yet no effective solution.

SUMMARY OF THE DISCLOSURE

A main purpose of the present disclosure is to provide a data processing method and device for Internet entity analysis, so as to solve the problem that indicator data of an Internet entity may not correspond to all historical states of the Internet entity in the related technology.

In order to achieve the purpose, according to one aspect of the present disclosure, a data processing method for Internet entity analysis is provided, which includes: acquiring an entity state which is an entity state of an Internet entity, the entity state including a first entity state and a second entity state, the first entity state being an entity state of the Internet entity at first time and the second entity state being an entity state of the Internet entity at second time; acquiring indicator data, the indicator data including first indicator data and second indicator data, the first indicator data being indicator data of the first entity state and the second indicator data being indicator data of the second entity state; and acquiring a corresponding relationship between the entity state and the indicator data, the corresponding relationship including a first corresponding relationship and a second corresponding relationship, the first corresponding relationship being a corresponding relationship between the first entity state and the first indicator data and the second corresponding relationship being a corresponding relationship between the second entity state and the second indicator data.

Furthermore, acquiring the entity state includes: detecting whether the entity state changes or not; and acquiring the latest entity state of the Internet entity when the entity state is detected to change.

Furthermore, one entity state corresponds to one or more pieces of indicator data, acquiring the first indicator data includes: acquiring one or more pieces of indicator data corresponding to the first entity state, and acquiring the second indicator data includes: acquiring one or more pieces of indicator data corresponding to the second entity state.

Furthermore, acquiring the indicator data includes: periodically acquiring the indicator data of the entity state.

Furthermore, the entity state is stored in an entity state table, the indicator data is stored in an indicator table, and the entity state table and the indicator table are database tables, wherein acquiring the corresponding relationship between the first entity state and the first indicator data includes: acquiring a first entity state foreign key, the first entity state foreign key being a field stored in the indicator table, the field being the same preset field which associates the first indicator data with the first entity state and the first entity state foreign key pointing to the first entity state in the entity state table, and acquiring the corresponding relationship between the first entity state and the first indicator data according to the first entity state foreign key; and acquiring the corresponding relationship between the second entity state and the second indicator data includes: acquiring a second entity state foreign key, the second entity state foreign key being a field stored in the indicator table, the field being the same preset field which associates the second indicator data with the second entity state and the second entity state foreign key pointing to the second entity state in the entity state table, and acquiring the corresponding relationship between the second entity state and the second indicator data according to the second entity state foreign key.

Furthermore, the Internet entity includes a first entity and a second entity, and the data processing method further includes: acquiring a corresponding relationship between the first entity and an entity state of the first entity; and acquiring a corresponding relationship between the second entity and an entity state of the second entity.

Furthermore, the Internet entity is stored in an entity table, the entity state is stored in the entity state table, and the entity table and the entity state table are database tables, wherein acquiring the corresponding relationship between the first entity and the entity state of the first entity includes: acquiring a corresponding relationship from the first entity to the entity state of the first entity and acquiring a corresponding relationship from the entity state of the first entity to the first entity, and acquiring the corresponding relationship from the first entity to the entity state of the first entity is to acquire a corresponding relationship from the first entity to a current state of the first entity; acquiring the corresponding relationship from the first entity to the current state of the first entity includes: acquiring a first entity state foreign key, the first entity state foreign key being a field stored in the entity table, the field being the same preset field which associates the first entity with the current state of the first entity and the first entity state foreign key pointing to the first entity state in the entity state table, and acquiring the corresponding relationship from the first entity to the entity state of the first entity according to the first entity state foreign key; acquiring the corresponding relationship from the entity state of the first entity to the first entity includes: acquiring a first entity foreign key, the first entity foreign key being a field stored in the entity state table, the field being the same preset field which associates the entity state of the first entity with the first entity, there being one or more first entity foreign keys and the first entity foreign key pointing to the first entity in the entity table, and acquiring the corresponding relationship from the entity state of the first entity to the first entity according to the first entity foreign key; acquiring the corresponding relationship between the second entity and the entity state thereof includes: acquiring a corresponding relationship from the second entity to the entity state of the second entity and acquiring a corresponding relationship from the entity state of the second entity to the second entity, and acquiring the corresponding relationship from the second entity to the entity state of the second entity is to acquire a corresponding relationship from the second entity to a current state of the second entity; acquiring the corresponding relationship from the second entity to the current state of the second entity includes: acquiring a second entity state foreign key, the second entity state foreign key being a field stored in the entity table, the field being the same preset field which associates the second entity with the current state of the second entity and the second entity state foreign key pointing to the second entity state in the entity state table, and acquiring the corresponding relationship from the second entity to the entity state of the second entity according to the second entity state foreign key; and acquiring the corresponding relationship from the entity state of the second entity to the second entity includes: acquiring a second entity foreign key, the second entity foreign key being a field stored in the entity state table, the field being the same preset field which associates the entity state of the second entity with the second entity, there being one or more second entity foreign keys and the second entity foreign key pointing to the second entity in the entity table, and acquiring the corresponding relationship from the entity state of the second entity to the second entity according to the second entity foreign key.

Furthermore, the Internet entity is stored in the entity table, the entity table and the entity state table are database tables, and the method further includes: acquiring a corresponding relationship from the indicator data to the Internet entity corresponding to the indicator data.

Furthermore, acquiring the corresponding relationship from the indicator data to the Internet entity corresponding to the indicator data includes: acquiring an entity foreign key, the entity foreign key being a field stored in the indicator table, the field being the same preset field which associates the indicator data with a current state of the Internet entity corresponding to the indicator data and the entity foreign key pointing to the entity in the entity table; and acquiring the corresponding relationship from the indicator data to the Internet entity corresponding to the indicator data according to the entity foreign key.

In order to achieve the purpose, according to another aspect of the present disclosure, a data processing device for Internet entity analysis is provided, which includes: an entity state acquisition unit, configured to acquire an entity state, the entity state being an entity state of an Internet entity, the entity state including a first entity state and a second entity state, the first entity state being an entity state of the Internet entity at first time and the second entity state being an entity state of the Internet entity at second time; an indicator data acquisition unit, configured to acquire indicator data, the indicator data including first indicator data and second indicator data, the first indicator data being indicator data of the first entity state and the second indicator data being indicator data of the second entity state; and a first corresponding relationship acquisition unit, configured to acquire a corresponding relationship between the entity state and the indicator data, the corresponding relationship including a first corresponding relationship and a second corresponding relationship, the first corresponding relationship being a corresponding relationship between the first entity state and the first indicator data and the second corresponding relationship being a corresponding relationship between the second entity state and the second indicator data.

Furthermore, the entity state acquisition unit includes: an entity state detection module, configured to detect whether the entity state changes or not; and an entity state acquisition module, configured to acquire the latest entity state of the Internet entity when the entity state is detected to change.

Furthermore, one entity state corresponds to one or more pieces of indicator data, and the indicator data acquisition unit includes: a first indicator data acquisition module, configured to acquire one or more pieces of indicator data corresponding to the first entity state, and a second indicator data acquisition module, configured to acquire one or more pieces of indicator data corresponding to the second entity state.

Furthermore, the indicator data acquisition unit acquires the indicator data in a manner of: periodically acquiring the indicator data of the entity state.

Furthermore, the entity state is stored in an entity state table, the indicator data is stored in an indicator table, and the entity state table and the indicator table are database tables, wherein the first corresponding relationship acquisition unit includes: a first acquisition module, configured to acquire the corresponding relationship between the first entity state and the first indicator data in a manner of: acquiring a first entity state foreign key, the first entity state foreign key being a field stored in the indicator table, the field being the same preset field which associates the first indicator data with the first entity state and the first entity state foreign key pointing to the first entity state in the entity state table, and acquiring the corresponding relationship between the first entity state and the first indicator data according to the first entity state foreign key; and a second acquisition module, configured to acquire the corresponding relationship between the second entity state and the second indicator data in a manner of: acquiring a second entity state foreign key, the second entity state foreign key being a field stored in the indicator table, the field being the same preset field which associates the second indicator data with the second entity state and the second entity state foreign key pointing to the second entity state in the entity state table, and acquiring the corresponding relationship between the second entity state and the second indicator data according to the second entity state foreign key.

Furthermore, the Internet entity includes a first entity and a second entity, the device further includes a second corresponding relationship acquisition unit, and the second corresponding relationship acquisition unit includes: a third acquisition module, configured to acquire a corresponding relationship between the first entity and an entity state of the first entity; and a fourth acquisition module, configured to acquire a corresponding relationship between the second entity and an entity state of the second entity.

Furthermore, the Internet entity is stored in an entity table, the entity state is stored in the entity state table, and the entity table and the entity state table are database tables, wherein the third acquisition module acquires the corresponding relationship between the first entity and the entity state of the first entity in a manner of: acquiring a corresponding relationship from the first entity to the entity state of the first entity and acquiring a corresponding relationship from the entity state of the first entity to the first entity, and acquiring the corresponding relationship from the first entity to the entity state of the first entity is to acquire a corresponding relationship from the first entity to a current state of the first entity; that the third acquisition module acquires the corresponding relationship from the first entity to the current state of the first entity includes: acquiring a first entity state foreign key, the first entity state foreign key being a field stored in the entity table, the field being the same preset field which associates the first entity with the current state of the first entity and the first entity state foreign key pointing to the first entity state in the entity state table, and acquiring the corresponding relationship from the first entity to the entity state of the first entity according to the first entity state foreign key; that the third acquisition module acquires the corresponding relationship from the entity state of the first entity to the first entity includes: acquiring a first entity foreign key, the first entity foreign key being a field stored in the entity state table, the field being the same preset field which associates the entity state of the first entity with the first entity, there being one or more first entity foreign keys and the first entity foreign key pointing to the first entity in the entity table, and acquiring the corresponding relationship from the entity state of the first entity to the first entity according to the first entity foreign key; the fourth acquisition module acquires the corresponding relationship between the second entity and the entity state thereof in a manner of: acquiring a corresponding relationship from the second entity to the entity state of the second entity and acquiring a corresponding relationship from the entity state of the second entity to the second entity, and acquiring the corresponding relationship from the second entity to the entity state of the second entity is to acquire a corresponding relationship from the second entity to a current state of the second entity; that the fourth acquisition module acquires the corresponding relationship from the second entity to the current state of the second entity includes: acquiring a second entity state foreign key, the second entity state foreign key being a field stored in the entity table, the field being the same preset field which associates the second entity with the current state of the second entity and the second entity state foreign key pointing to the second entity state in the entity state table, and acquiring the corresponding relationship from the second entity to the entity state of the second entity according to the second entity state foreign key; and that the fourth acquisition module acquires the corresponding relationship from the entity state of the second entity to the second entity includes: acquiring a second entity foreign key, the second entity foreign key being a field stored in the entity state table, the field being the same preset field which associates the entity state of the second entity with the second entity, there being one or more second entity foreign keys and the second entity foreign key pointing to the second entity in the entity table, and acquiring the corresponding relationship from the entity state of the second entity to the second entity according to the second entity foreign key.

Furthermore, the device further includes: a third corresponding relationship acquisition unit, configured to acquire a corresponding relationship from the indicator data to the Internet entity corresponding to the indicator data.

Furthermore, the third corresponding relationship acquisition unit acquires the corresponding relationship from the indicator data to the Internet entity corresponding to the indicator data in a manner of: acquiring an entity foreign key, the entity foreign key being a field stored in the indicator table, the field being the same preset field which associates the indicator data with a current state of the Internet entity corresponding to the indicator data and the entity foreign key pointing to the entity in the entity table; and acquiring the corresponding relationship from the indicator data to the Internet entity corresponding to the indicator data according to the entity foreign key.

By the present disclosure, the entity state and indicator data of the Internet entity and the corresponding relationship between the entity state and the indicator data are acquired, so that the problem that the indicator data of the Internet entity may not correspond to all the historical states of the Internet entity in the related technology is solved, and correspondence between the indicator data of the Internet entity and all the historical states of the Internet entity is implemented. In such a manner, a client may obtain the most accurate data analysis result when performing indicator data analysis because each piece of indicator data may correspond to the current entity state according to the corresponding relationship between the entity state and the indicator data.

BRIEF DESCRIPTION OF THE DRAWINGS

The drawings, forming a part of the present disclosure, are adopted to provide further understanding of the present disclosure. Schematic embodiments of the present disclosure and description thereof are adopted to explain the present disclosure and not intended to form improper limits to the present disclosure. In the drawings.

DETAILED DESCRIPTION OF THE EMBODIMENTS

It is important to note that the embodiments in the present disclosure and characteristics in the embodiments can be combined under the condition of no conflicts. The present disclosure will be described below with reference to the drawings and the embodiments in detail.

According to the embodiment of the present disclosure, a data processing method for Internet entity analysis is provided. The method may run in computer processing equipment.

Figure 1:
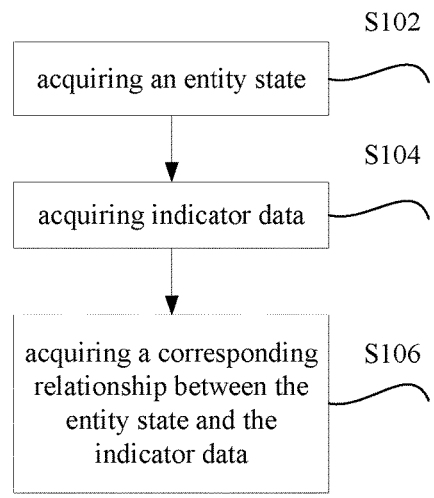
FIG. 1 is a flowchart of a data processing method for Internet entity analysis according to an embodiment of the present disclosure.

FIG. 1 is a flowchart of a data processing method for Internet entity analysis according to an embodiment of the present disclosure.

As shown in FIG. 1, the data processing method for Internet entity analysis includes the following steps.

Step 102: acquiring an entity state.

The entity state is a state of an Internet entity, it is important to note that the Internet entity mentioned in the embodiment of the present disclosure may be an Internet advertisement, a network monitoring entity and the like, the network monitoring entity may be an image, sound, video and the like monitored by a network. Such as Internet entities in one or more historical state, while analyzing the Internet entities, the data processing method provided by the embodiment of the present disclosure may be applied.

Figure 2:
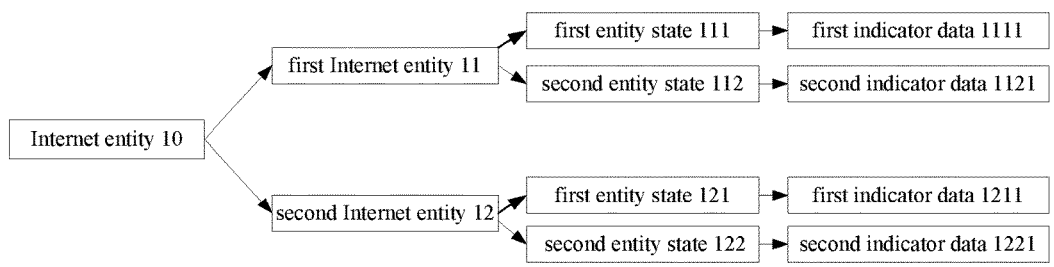
FIG. 2 is a schematic diagram of a corresponding relationship among an Internet entity, an entity state and indicator data according to an embodiment of the present disclosure.

The entity state may be a historical state and current state of the Internet entity. The Internet entity 10 may include one or more Internet entities. As shown in FIG. 2, the Internet entity 10 may include a first Internet entity 11 and a second Internet entity 12, and acquiring the entity state of the Internet entity 10 may be acquiring a first entity state 111 and second entity state 112 of the first Internet entity 11, may also be acquiring a first entity state 121 and second entity state 122 of the second Internet entity 12, and may further be acquiring the first entity state 111 of the first Internet entity 11 and the first entity state 121 of the second Internet entity 12. The first Internet entity 11 and the second Internet entity 12 are different Internet entities, and the first entity state and the second entity state are different entity states, for example, entity states at different time. The first entity state 111 of the first Internet entity and the first entity state 121 of the second Internet entity 12 may be entity states of the first Internet entity 11 and the second Internet entity 12 at first time respectively, and the second entity state 112 of the first Internet entity 11 and the second entity state 122 of the second Internet entity 12 may be entity states of the first Internet entity 11 and the second Internet entity 12 at second time respectively.

Figure 3:
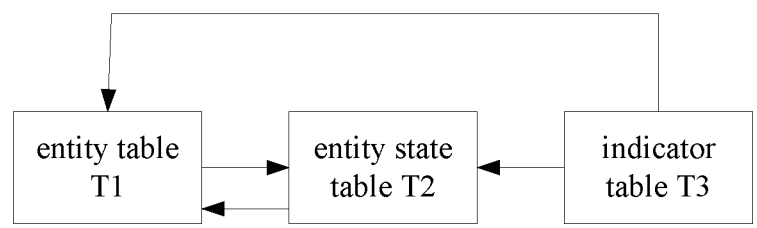
FIG. 3 is a schematic diagram of an entity table, an entity state table and an indicator table according to an embodiment of the present disclosure.

As shown in FIG. 3, after the entity state of the Internet entity is acquired, the entity state of the Internet entity may be stored in an entity table T1 and an entity state table T2, and the entity table T1 and the entity state table T2 may be database tables.

The entity state stored in the entity table T1 may be a current state, and preferably, a previous state which is stored may be deleted when the current state is stored, so that only the latest current states of all the Internet entities are stored in the entity table T1, and a size of the entity table T1 may be reduced.

It is important to note that the first entity state and second entity state mentioned in the present disclosure are only taken as examples and do not specifically refer to two entity states, and there may be multiple entity states. Similarly, the Internet entity 11 and the Internet entity 12 are also taken as examples and do not specifically refer to two Internet entities, and there may be multiple Internet entities.

For example, the Internet entity may be an Internet advertisement, there may be one or more Internet advertisements, and acquiring an entity state of the Internet advertisement may be acquiring entity states of one or more Internet advertisements. The entity state of the Internet advertisement may be a state snapshot of the Internet advertisement, and acquiring the entity state of the Internet advertisement may be acquiring the state snapshot of the Internet advertisement. The state snapshot of the Internet advertisement may be a historical snapshot and current snapshot of the Internet advertisement, and acquiring the state snapshot of the Internet advertisement may be acquiring the historical snapshot and current snapshot of the Internet advertisement.

Figure 4:
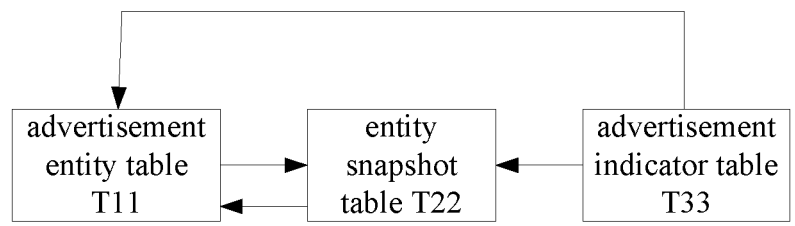
FIG. 4 is a schematic diagram of an advertisement entity table, an entity snapshot table and an advertisement indicator table according to an embodiment of the present disclosure.

As shown in FIG. 4, the current snapshot of the Internet advertisement may be stored in an advertisement entity table T11 and an entity snapshot table T22 after being acquired, and the advertisement entity table T11 and the entity snapshot table T22 may be database tables. Wherein, a previous snapshot of the Internet advertisement corresponding to the current snapshot is deleted before the current snapshot is stored in the advertisement entity table T11, so that only the latest current snapshots of all the Internet advertisements are stored in the advertisement entity table T11, a size of the advertisement entity table T11 may be reduced, and a storage space may be saved.

Preferably, the embodiment of the present disclosure may include a step of detecting whether the entity state of the Internet entity changes or not before Step 102 of acquiring the entity state. The current state of the Internet entity is acquired when the entity state of the Internet entity is detected to change. After the current state is acquired, a previous current state of the Internet entity corresponding to the current state is deleted from the entity table T1, then the latest current state of the Internet entity is stored in the entity table T1, and meanwhile, the current state of the Internet entity is stored in the entity state table T2. Detecting whether the entity state changes or not may be detecting whether an entity state of an existing Internet entity changes or not, and may also be detecting whether there is an entity state of a new Internet entity or not. After the entity state of the new Internet entity is detected, a current state of the new Internet entity is acquired. After the current state of the new Internet entity is acquired, the current state of the new Internet entity is stored in the entity table T1 and the entity state table T2.

In such a manner, when the entity state of the Internet entity changes, the current state of the Internet entity is acquired and the acquired current state of the Internet entity is stored in the entity state table T2, so that the size of the entity state table T2 may be reduced, and the storage space is saved. In addition, before the latest current state of the Internet entity is stored in the entity table T1, the previous current state of the Internet entity is deleted from the entity table T1, so that the size of the entity table T1 is reduced, and the storage space is saved.

Preferably, whether the entity state of the Internet entity changes or not may further be detected at first before the entity state is acquired, the current state of the Internet entity is acquired when the entity state of the Internet entity is detected to change, and if whether entity states of multiple Internet entities change or not is detected, all the Internet entities of which the entity states change are marked when the entity states of multiple Internet entities are detected to change. After current states of the Internet entities of which the entity states change are acquired, previous current states of the marked Internet entities of which the entity states change are deleted from the entity table, the latest current states of all the marked Internet entities of which the entity states change are stored into the entity table T1 in batches at the same time, and moreover, the latest current states of all the marked Internet entities of which the entity states change are stored into the entity state table T2.

Preferably, whether there is an entity state of a new Internet entity or not may also be detected before the entity state is acquired, a current state of the new Internet entity is acquired when the entity state of the new Internet entity is detected, and if entity states of multiple new Internet entities are detected, current states of all the new Internet entities are acquired, and all the new Internet entities are marked. After the current states of all the new Internet entities are acquired, the current states of all the marked new Internet entities are stored into the entity table T1 and the entity state table T2 in batches.

In such a manner, the current states of all the Internet entities of which the entity states change or all the new Internet entities are acquired and stored in batches, so that time consumption may be reduced, and working efficiency may be improved.

When the Internet entity is an Internet advertisement, acquiring the state of the Internet entity may be acquiring a current state of the Internet advertisement, whether the current state of the Internet advertisement changes or not may be detected after the current state of the Internet advertisement is acquired, and the latest current snapshot of the Internet advertisement is acquired when the current state of the Internet advertisement is detected to change. After the latest current snapshot of the Internet advertisement is acquired, a previous current snapshot of the Internet advertisement is deleted from the advertisement entity table T11, the latest current snapshot of the Internet advertisement is stored into the advertisement entity table T11, and meanwhile, the latest current snapshot of the Internet advertisement is stored into the entity snapshot table T22. If an entity state of a new Internet advertisement is detected, a current snapshot of the new Internet advertisement is acquired. After the current snapshot of the new Internet advertisement is acquired, the current snapshot of the new Internet advertisement is stored into the advertisement entity table T11 and the entity snapshot table T22.

In such a manner, when the current snapshot of the Internet advertisement changes, the latest current snapshot of the Internet advertisement is acquired, and the acquired latest current snapshot of the Internet advertisement is stored into the entity snapshot table T22, so that the size of the entity snapshot table T22 may be reduced, and the storage space may be saved.

If current states of multiple Internet advertisements are detected to change, the latest current snapshots corresponding to all the Internet advertisements of which the states change are acquired, and all the Internet advertisements of which the states change are marked. After the latest current snapshots of all the Internet advertisements of which the states change are acquired, current snapshots of all the marked Internet advertisements of which the states change are deleted from the advertisement entity table T11, the latest current snapshots of all the marked Internet advertisements of which the states change are stored into the advertisement entity table T11 in batches, and meanwhile, the latest current snapshots of all the marked Internet advertisements of which the states change are stored into the entity snapshot table T22 in batches. If current snapshots of multiple new Internet advertisements are detected, the current snapshots of all the new Internet advertisements are acquired, and all the new Internet advertisements are marked. After the current snapshots of all the new Internet advertisements are acquired, the current snapshots of all the marked new Internet advertisements are stored into the advertisement entity table T11 and the entity snapshot table T22 in batches.

In such a manner, the latest current snapshots of all the Internet advertisements of which the states change or all the new Internet advertisements are acquired and stored in batches, so that time consumption may be reduced, and working efficiency may be improved.

Step 104: acquiring indicator data.

The indicator data is an indicator data of the entity state. As shown in FIG. 2, acquiring the indicator data may be acquiring first indicator data 1111 and first indicator data 1211 and acquiring second indicator data 1121 and second indicator data 1221. The first indicator data 1111 and the first indicator data 1211 may be indicator data of the first entity state 111 of the first Internet entity 11 and indicator data of the first entity state 121 of the second Internet entity 12 respectively, and the second indicator data 1121 and the second indicator data 1221 may be indicator data of the second entity state 112 of the first Internet entity 11 and indicator data of the second entity state 122 of the second Internet entity 12 respectively. As shown in FIG. 3, the indicator data may be stored in an indicator table T3 after being acquired, and the indicator table T3 may be a database table.

In the embodiment of the present disclosure, one entity state may correspond to indicator data of one or more indicators, acquiring the first indicator data may be acquiring indicator data of one or more indicators corresponding to the first entity state, and acquiring the second indicator data may be acquiring indicator data of one or more indicators corresponding to the second entity state.

In such a manner, the client may learn about development trends of the Internet entity in different aspects respectively when analyzing one or more pieces of indicator data corresponding to different states of the Internet entity.

For example, when the Internet entity 10 is an Internet advertisement, the first entity state is a historical snapshot of the Internet advertisement, the second entity state is a current snapshot of the Internet advertisement, indicator data corresponding to the historical snapshot and the current snapshot may be indicator data of an indicator such as a display number, cost and click number of the Internet advertisement, and acquiring the indicator data of the historical snapshot and the current snapshot may be acquiring the indicator data, corresponding to the historical snapshot and the current snapshot respectively, such as the display number, cost, click number and the like of the Internet advertisement. As shown in FIG. 4, the indicator data may be stored into an advertisement indicator table T33 after being acquired, and the advertisement indicator table T33 may be a database table.

In such a manner, the client may learn about development trends of the Internet advertisement in different aspects such as the display number, the cost and the click number respectively when analyzing the indicator data, such as the display, the cost and the click, corresponding to the historical snapshot and current snapshot of the Internet advertisement when the Internet advertisement is delivered.

Preferably, in the embodiment of the present disclosure, acquiring the indicator data may be periodically acquiring the indicator data of the entity state.

For example, when the Internet entity is the Internet advertisement, the current snapshot of the Internet advertisement corresponds to the indicator data such as the display number, cost and click number of the Internet advertisement, and acquiring the current snapshot of the Internet advertisement may be acquiring the indicator data, corresponding to the current snapshot of the Internet advertisement, such as the display number, cost and click number of the Internet advertisement every 12 hours.

In such a manner, the client may acquire more uniform indicator data when analyzing the indicator data of the Internet entity, so that influence of occasionality on data analysis is avoided.

Step 106: acquiring a corresponding relationship between the entity state and the indicator data.

Acquiring the corresponding relationship between the entity state and the indicator data may be acquiring a first corresponding relationship and a second corresponding relationship. The first corresponding relationship may be a corresponding relationship between the first entity state and the first indicator, and the second corresponding relationship may be a corresponding relationship between the second entity state and the second indicator data. After the corresponding relationship between the entity state and the indicator data is acquired, the corresponding relationship may be stored in a corresponding database table (such as the entity table T1, the entity state table T2 and the indicator table T3).

In the embodiment of the present disclosure, acquiring the corresponding relationship between the first entity state and the first indicator data may be acquiring a first entity state foreign key. The first entity state foreign key may be the same preset field which associates the first indicator data with the first entity state. Acquiring the corresponding relationship between the second entity state and the second indicator data may be acquiring a second entity state foreign key. The second entity state foreign key may be the same preset field which associates the second indicator data with the second entity state. The first entity state foreign key and the second entity foreign key may be stored into the indicator table T3 after being acquired. The corresponding relationship between the first entity state and the first indicator data may be acquired according to the first entity state foreign key, and the corresponding relationship between the second entity state and the second indicator data may be acquired according to the second entity state foreign key. As shown in FIG. 3, an association from the indicator table T3 to the entity state table T2 may be established by acquiring and storing the entity state foreign keys into the indicator table T3.

In such a manner, the corresponding relationship between different entity states and their corresponding indicator data may be acquired by acquiring different foreign keys. The client may establish correspondence of each piece of indicator data to the corresponding entity state when analyzing the indicator data, so that the shortcoming that the indicator data may only correspond to the current state is overcome, and the effect of higher accuracy of an analysis result is further achieved.

For example, when the Internet entity is the Internet advertisement, acquiring a corresponding relationship between the state snapshot and indicator data of the Internet advertisement may be acquiring a corresponding relationship between the historical snapshot of the Internet advertisement and corresponding indicator data and acquiring a corresponding relationship between the current snapshot and corresponding indicator data. As shown in FIG. 4, after the corresponding relationship between the state snapshot and the indicator data is acquired, the corresponding relationship may be stored in to the advertisement indicator table T33. Acquiring the corresponding relationship between the historical snapshot and the corresponding indicator data may be acquiring different historical snapshot foreign keys. Different historical snapshot foreign keys are all stored into the advertisement indicator table T33 after being acquired.

In such a manner, the client may establish correspondence of each piece of indicator data to the corresponding historical snapshot and current snapshot when acquiring all the indicator data for analysis before the Internet advertisement is delivered, so that the client may gain experiences in delivery of Internet advertisements and predict a development trend of the Internet advertisement in the future to further plan a correct delivery strategy.

The embodiment of the present disclosure may include a step of acquiring a corresponding relationship between an Internet entity and its entity state after Step 102 of acquiring the entity state. When there are multiple Internet entities, acquiring the corresponding relationship between the Internet entity and its entity state may be acquiring a corresponding relationship between the first Internet entity and the first entity state and acquiring a corresponding relationship between the second Internet entity and the second entity state.

Acquiring the corresponding relationship between the first Internet entity and the first entity state may be acquiring a corresponding relationship from the first Internet entity to the first entity state and acquiring a corresponding relationship from the first entity state to the first Internet entity. Acquiring the corresponding relationship from the first Internet entity to the first entity state is to acquire a corresponding relationship from the first Internet entity to a current state of the first Internet entity, and may be acquiring the first entity state foreign key. Acquiring the first entity state foreign key may be acquiring the same preset field which associates the first Internet entity with the first entity state. Acquiring the corresponding relationship from the entity state of the first Internet entity to the first Internet entity may be acquiring a first entity foreign key, and acquiring the first entity foreign key may be acquiring the same preset field which associates the first Internet entity with the first entity state, wherein there is one or more first entity foreign keys. The first entity state foreign key of the first Internet entity may be stored into the entity table T1 after being acquired. The first entity foreign key may be stored into the entity state table T2 after being acquired.

Similarly, acquiring the corresponding relationship between the second Internet entity and the second entity state may be acquiring a corresponding relationship from the second Internet entity to the second entity state and acquiring a corresponding relationship from the second entity state to the second Internet entity. Acquiring the corresponding relationship from the second Internet entity to the second entity state is to acquire a corresponding relationship from the second Internet entity to a current state of the second Internet entity, and may be acquiring the second entity state foreign key. Acquiring the second entity state foreign key may be acquiring the same preset field which associates the second Internet entity with the second entity state. Acquiring the corresponding relationship from the second entity state to the second Internet entity may be acquiring a second entity foreign key. Acquiring the second entity foreign key may be acquiring the same preset field which associates the second Internet entity with the second entity state, and there is one or more second entity foreign keys. The second entity state foreign key may be stored into the entity table T1 after being acquired. The second entity foreign key may be stored into the entity state table T2 after being acquired.

In such a manner, the corresponding relationship from the first Internet entity to the first entity state is acquired by acquiring the first entity state foreign key; the corresponding relationship from the first entity state to the first Internet entity is acquired by acquiring the first entity foreign key; the corresponding relationship from the second Internet entity to the second entity state is acquired by acquiring the second entity state foreign key; and the corresponding relationship from the second entity state to the second Internet entity is acquired by acquiring the second entity foreign key. The corresponding association may be established between the entity table T1 and the entity state table T2 by acquiring and storing the foreign keys. The entity table T1 may be directly docked to the entity state table T2 by storing the entity state foreign keys in the entity table T1, and the entity state table T2 may also be docked with the indicator table T3 by the entity state foreign keys stored in the indicator table T3, so that docking query efficiency is improved. As shown in FIG. 3, a direction of an arrow represents each association relationship.

For example, when the Internet entity is the Internet advertisement, acquiring a corresponding relationship between the Internet advertisement and its state snapshot may be acquiring a corresponding relationship between the Internet advertisement and its historical snapshot and acquiring a corresponding relationship between the Internet advertisement and its current snapshot. Acquiring the corresponding relationship between the Internet advertisement and its historical snapshot may be acquiring a corresponding relationship from the historical snapshot to the Internet advertisement. Acquiring the corresponding relationship from the historical snapshot to the Internet advertisement may be acquiring an entity foreign key, and acquiring the entity foreign key may be acquiring the same preset field which associates the historical snapshot with the Internet advertisement, wherein there is one or more entity foreign keys. Acquiring the corresponding relationship between the Internet advertisement and its current snapshot may be acquiring a corresponding relationship from the Internet advertisement to its current snapshot and acquiring a corresponding relationship from the current snapshot of the Internet advertisement to the Internet advertisement. Acquiring the corresponding relationship from the Internet advertisement to its current snapshot may be acquiring a snapshot foreign key, and acquiring the snapshot foreign key may be acquiring the same preset field which associates the current snapshot with the Internet advertisement. Acquiring the corresponding relationship from the current snapshot of the Internet advertisement to the Internet advertisement may be acquiring an entity foreign key, and acquiring the entity foreign key may be acquiring the same preset field which associates the Internet advertisement with its current snapshot. The snapshot foreign key is stored into the advertisement entity table T11 after being acquired. The entity foreign key is stored into the entity snapshot table T22 after being acquired. The entity snapshot table T22 may be docked with the advertisement indicator table T33 by a snapshot foreign key stored in the advertisement indicator table T33, so that docking query efficiency is improved. As shown in FIG. 4, a direction of an arrow represents each association relationship.

In such a manner, a corresponding association may be established between the advertisement entity table T11 and the entity snapshot table T22 by acquiring and storing each snapshot foreign key and each entity foreign key.

The embodiment of the present disclosure may include a step of acquiring a corresponding relationship from the indicator data to the corresponding Internet entity after Step 104 and before Step 106.

The Internet entity is stored in the entity table T1 and the latest current state of the Internet entity is stored in the entity table T1, so that acquiring the corresponding relationship from the indicator data to the corresponding Internet entity is to acquire a corresponding relationship from the indicator data to the latest current state of the corresponding Internet entity, and may be acquiring the entity foreign key. Acquiring the entity foreign key may be acquiring the same preset field which associates the indicator data with the latest current state of the corresponding Internet entity. After the entity foreign key is acquired, the entity foreign key is stored into the indicator table T3. As shown in FIG. 3, an association from the indicator table T3 to the entity table T1 is established by acquiring and storing the entity foreign key into the indicator table T3.

In such a manner, the corresponding relationship from the indicator data to the corresponding Internet entity may be acquired by acquiring the entity foreign key. In addition, in combination with the entity state foreign key stored in the entity table T1, the indicator table T3 may simultaneously associated with the entity table T1 and the entity state table T2. During data analysis, by the associations, the indicator table T3 may be associated with the entity table T1 by the entity foreign key at first and then the entity table T1 is associated with the entity state table T2 by the entity state foreign key. The entity state of the Internet entity is deleted from the entity table T1 after the current state of the Internet entity is acquired, the latest current state of the Internet entity is stored into the entity table T1, the latest current state of the Internet entity is directly stored into the entity state table T2 at the same time, and a data volume of the entity state table T2 is obviously much larger than that of the entity table T1. Therefore, direct association querying with the entity state table T2 with larger data volume may be avoided by the associations.

Preferably, for the same entity state, the entity state foreign key acquired or stored in the step of acquiring the corresponding relationship from the indicator data to the corresponding Internet entity and Step 106 is the same foreign key in the embodiment of the present disclosure. For example, when the Internet entity is the Internet advertisement, for the same current snapshot, the snapshot foreign key acquired or stored in the step of acquiring the corresponding relationship from the indicator data to the corresponding Internet entity and Step 106 is the same foreign key.

In such a manner, the indicator table T3 may be simultaneously associated with the entity table T1 and the entity state table T2 by the entity state foreign key, and since the current state is stored in the entity table T1 and the historical state and the current state are stored in the entity state table T2, conventional current-state-based data querying and historical-current-based data analysis may be simultaneously supported by the embodiment of the present disclosure, and storage of redundant data is avoided.

In the embodiment of the present disclosure, correspondence between the entity state and the indicator data is established by the steps. When the client delivers entity (such as advertisement and network monitoring) data, for example, delivering the Internet advertisement, the acquired related indicator (such as display, cost and click) data of the Internet advertisement may correspond to all state snapshots of the Internet advertisement, the client may accurately learn about previous conditions of the display number, cost, click rate and the like of the Internet advertisement by analyzing the historical data of related indicators within a period time, and the client may accurately regulate strategies of advertisement delivery, pricing and the like in the future after summing up experiences and predicting the development trend.

Figure 5:
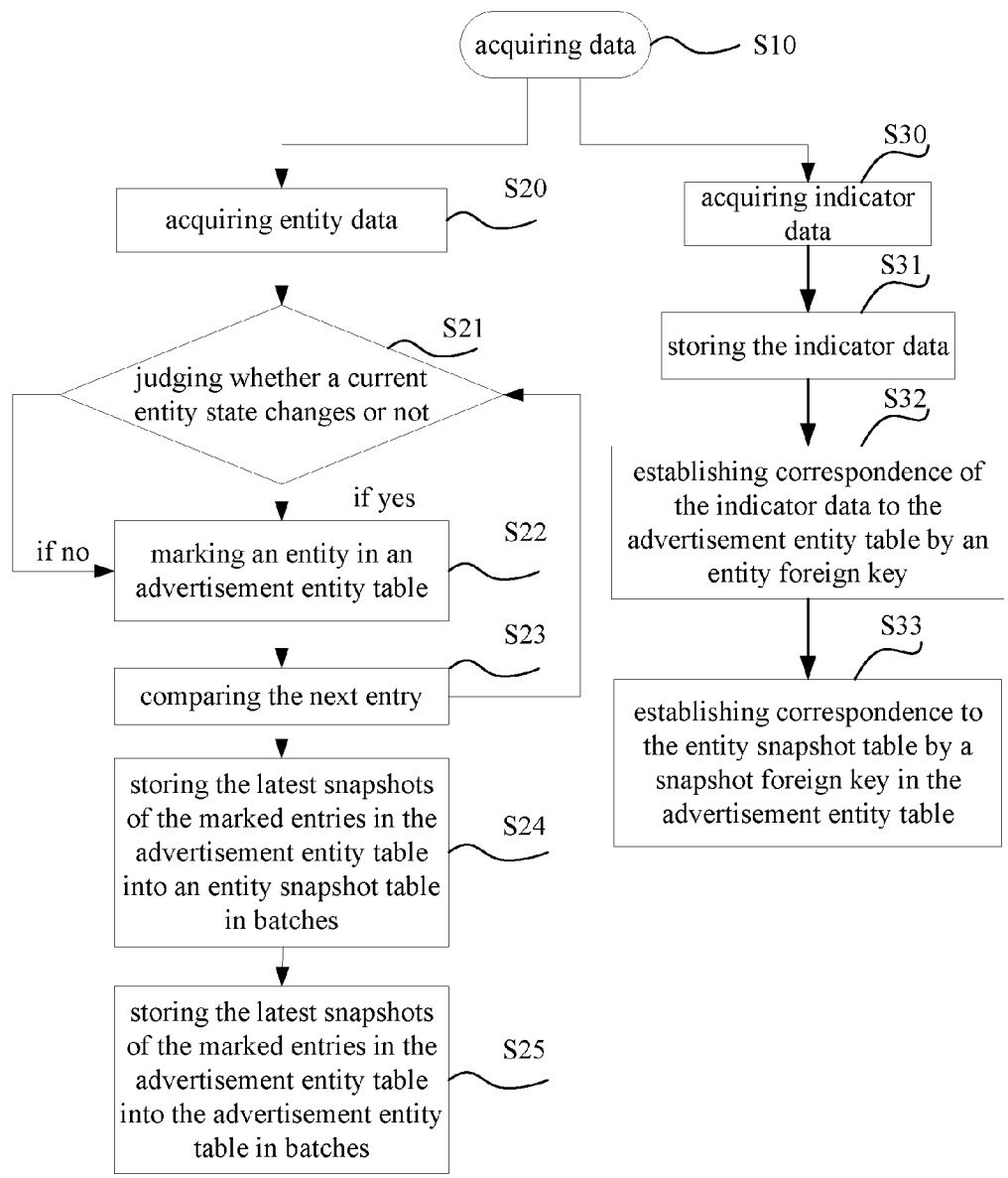
FIG. 5 is a flowchart of a data processing method for Internet advertisement analysis according to an embodiment of the present disclosure.

FIG. 5 is a flowchart of a data processing method for Internet advertisement analysis according to an embodiment of the present disclosure.

In one embodiment of the present disclosure, the data processing method for Internet advertisement analysis, as shown in FIG. 5, includes the following steps.

Step 10: acquiring data.

Acquiring data may include acquiring entity state data and acquiring indicator data. If the entity state data is acquired, Step 20 is executed, and if the indicator data is acquired, Step 30 is executed.

Step 20: acquiring the entity state data.

Acquiring the entity state data may be acquiring entity state data, which is shared in different host computers, in a database. The entity state data may be state data of multiple Internet entities at the same time, and may also be state data of one or more Internet entities at different time.

Step 21: judging whether a current entity state changes or not.

For example, the acquired state data is compared with entity state data stored in an advertisement entity table one by one to judge whether a state of an advertisement entity changes or not, and specifically, the acquired entity state data may be compared with a current snapshot stored in the advertisement entity table for judgment. A change in the entity state may includes a change of an original state of the advertisement entity, may also include replacement of the original state of the advertisement entity with a state of another advertisement entity, and may further include addition of a state of a new advertisement entity.

If the current entity state changes, Step 22 is executed, and if the current entity state does not change, Step 23 is executed.

Step 22: marking an entry in the advertisement entity table.

If the current entity state of the advertisement in Step 21 changes, the Internet entity, such as an Internet advertisement, of which the current entity state changes in the advertisement entity table is marked.

Step 23: performing comparison on the next entry.

If the current entity state of the advertisement in Step 21 does not change, a current entity state of the next Internet entity, such as the next Internet advertisement, is acquired, and Step 21 is repeated.

Step 24: storing the latest states, such as the latest snapshots, of the marked entries in the advertisement entity table into an entity snapshot table in batches.

Step 25: storing the latest states, such as the latest snapshots, of the marked entries in the advertisement entity table into the advertisement entity table in batches.

Before storing the latest snapshots of the marked entries in the advertisement entity table into the advertisement entity table in batches, current snapshots of the marked entries are deleted from the advertisement entity table in batches.

Step 30: acquiring indicator data.

The indicator data is acquired at a preset time, and if the indicator data is periodically acquired, the indicator data is acquired at preset periodic time.

Step 31: storing the indicator data.

After the indicator data is acquired, the indicator data may be stored into a preset advertisement indicator table, and meanwhile, an entity foreign key and corresponding snapshot foreign key of an Internet advertisement corresponding to the indicator data may also be stored in the advertisement indicator table.

Step 32: establishing correspondence of the indicator data to the advertisement entity table by the entity foreign key.

When the acquired indicator data is stored in Step 31, the corresponding entity foreign key is stored in the advertisement indicator table.

In such a manner, the indicator data may correspond to the corresponding Internet advertisement in the advertisement entity table according to the advertisement entity foreign key, and an association between the indicator data and the corresponding Internet advertisement is established, so that data may be queried on the basis of the latest current snapshot.

Step 33: establishing correspondence to the entity snapshot table by a snapshot foreign key in the advertisement entity table.

When the acquired indicator data is stored in Step 31, the corresponding snapshot foreign key is stored in the advertisement indicator table, and the snapshot foreign key and the corresponding snapshot foreign key stored in the advertisement entity table are the same foreign key.

In such a manner, correspondence of the entity foreign key stored in the advertisement indicator table to the corresponding Internet advertisement in the advertisement entity table is established, and correspondence of the snapshot foreign key stored in the advertisement entity table to the corresponding snapshot in the entity snapshot table is established, so that the association between the indicator data and the corresponding snapshot is finally established. Compared with another association established between the indicator data and the corresponding snapshot, namely compared with an association established by directly establishing correspondence of the corresponding snapshot foreign key stored in the advertisement indicator table to the corresponding snapshot, the former reduces direct association querying with the entity snapshot table with a larger data volume, thereby reducing time consumption and increasing querying speed.

In the embodiment of the present disclosure, the entity state table may serve as a dimension table and the indicator table may serve as a fact table, so that a star mode association may be established between the entity state table and the indicator table to fulfill the aim of performing multidimensional analysis on data by virtue of a data warehouse technology to further provide a more detailed data cross-analysis result for the client.

The embodiment of the present disclosure further provides a data processing device for Internet entity analysis. It is important to note that the data processing device for Internet entity analysis in the embodiment of the present disclosure may be configured to execute a data processing method for Internet entity analysis in the embodiment of the present disclosure and that the data processing method for Internet entity analysis in the embodiment of the present disclosure may also be executed on the data processing device for Internet entity analysis in the embodiment of the present disclosure.

According to the embodiment of the present disclosure, a data processing device for Internet entity analysis is provided.

Figure 6:
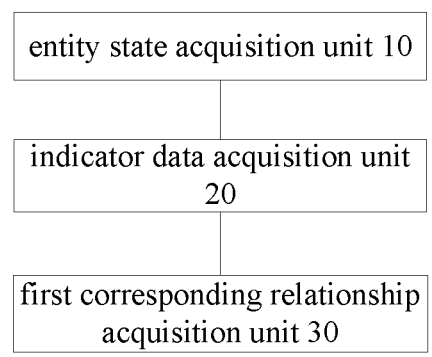
FIG. 6 is a schematic diagram of a data processing device for Internet entity analysis according to an embodiment of the present disclosure.

FIG. 6 is a schematic diagram of a data processing device for Internet entity analysis according to an embodiment of the present disclosure.

As shown in FIG. 6, the device includes: an entity state acquisition unit 10, an indicator data acquisition unit 20 and a first corresponding relationship acquisition unit 30.

The entity state acquisition unit 10 may be configured to acquire an entity state. The entity state may be an entity state of an Internet entity, and the entity state may include a first entity state and a second entity state. The first entity state may be an entity state of the Internet entity at first time, and the second entity state may be an entity state of the Internet entity at second time.

The indicator data acquisition unit 20 may be configured to acquire indicator data. The indicator data may include first indicator data and second indicator data. The first indicator data may be indicator data of the first entity state, and the second indicator data may be indicator data of the second entity state.

The first corresponding relationship acquisition unit 30 may be configured to acquire a corresponding relationship between the entity state and the indicator data. The corresponding relationship may include a first corresponding relationship and a second corresponding relationship. The first corresponding relationship may be a corresponding relationship between the first entity state and the first indicator data, and the second corresponding relationship may be a corresponding relationship between the second entity state and the second indicator data.

In the embodiment of the present disclosure, the entity state acquisition unit 10 may include: an entity state detection module and an entity state acquisition module. The entity state detection module may be configured to detect whether the entity state changes or not. When the entity state is detected to change, the entity state acquisition module may be configured to acquire the latest entity state of the Internet entity.

In the embodiment of the present disclosure, one entity state may correspond to one or more pieces of indicator data. The indicator data acquisition unit may include: a first indicator data acquisition module and a second indicator data acquisition module. The first indicator data acquisition module may be configured to acquire one or more pieces of indicator data corresponding to the first entity state, and the second indicator data acquisition module may be configured to acquire one or more pieces of indicator data corresponding to the second entity state. Preferably, the indicator data acquisition unit may periodically acquire the indicator data of the entity state.

In the embodiment of the present disclosure, the entity state may be stored in an entity state table, the indicator data may be stored in an indicator table, the entity state table and the indicator table may be database tables, and the first corresponding relationship acquisition unit may include: a first acquisition module and a second acquisition module.

The first acquisition module may acquire the corresponding relationship between the first entity state and the first indicator data in a manner of: acquiring a first entity state foreign key, the first entity state foreign key being a field stored in the indicator table, the field being the same preset field which associates the first indicator data with the first entity state and the first entity state foreign key pointing to the first entity state in the entity state table, and acquiring the corresponding relationship between the first entity state and the first indicator data according to the first entity state foreign key.

The second acquisition module may acquire the corresponding relationship between the second entity state and the second indicator data in a manner of: acquiring a second entity state foreign key, the second entity state foreign key being a field stored in the indicator table, the field being the same preset field which associates the second indicator data with the second entity state and the second entity state foreign key pointing to the second entity state in the entity state table, and acquiring the corresponding relationship between the second entity state and the second indicator data according to the second entity state foreign key.

In the embodiment, the Internet entity may include a first entity and a second entity, the device may further include a second corresponding relationship acquisition unit, and the second corresponding relationship acquisition unit may include: a third acquisition module and a fourth acquisition module. The third acquisition module may be configured to acquire a corresponding relationship between the first entity and an entity state of the first entity. The fourth acquisition module may be configured to acquire a corresponding relationship between the second entity and an entity state of the second entity.

In the embodiment of the present disclosure, the Internet entity may be stored in the entity table, the entity state may be stored in the entity state table, and the entity table and the entity state table may be database tables. The third acquisition module may acquire the corresponding relationship between the first entity and the entity state of the first entity in a manner of: acquiring a corresponding relationship from the first entity to the entity state of the first entity and acquiring a corresponding relationship from the entity state of the first entity to the first entity, and acquiring the corresponding relationship from the first entity to the entity state of the first entity is to acquire a corresponding relationship from the first entity to a current state of the first entity.

That the third acquisition module acquires the corresponding relationship from the first entity to the current state of the first entity may include: acquiring a first entity state foreign key. The first entity state foreign key may be a field stored in the entity table, and the field may be the same preset which associates the first entity with the current state of the first entity. The first entity state foreign key points to the first entity state in the entity state table, and the corresponding relationship from the first entity to the entity state of the first entity is acquired according to the first entity state foreign key.

That the third acquisition module acquires the corresponding relationship from the entity state of the first entity to the first entity may include: acquiring a first entity foreign key. The first entity foreign key may be a field stored in the entity state table, the field may be the same preset field which associates the entity state of the first entity with the first entity, and there may be one or more first entity foreign keys. The first entity foreign key points to the first entity in the entity table, and the corresponding relationship from the entity state of the first entity to the first entity is acquired according to the first entity foreign key.

The fourth acquisition module acquires the corresponding relationship between the second entity and its entity in a manner of: acquiring a corresponding relationship from the second entity to the entity state of the second entity and acquiring a corresponding relationship from the entity state of the second entity to the second entity. Acquiring the corresponding relationship from the second entity to the entity state of the second entity may be acquiring a corresponding relationship from the second entity to a current state of the second entity.

That the fourth acquisition module acquires the corresponding relationship from the second entity to the current state of the second entity may include: acquiring a second entity state foreign key. The second entity state foreign key may be a field stored in the entity table, and the field may be the same preset which associates the second entity with the current state of the second entity. The second entity state foreign key points to the second entity state in the entity state table, and the corresponding relationship from the second entity to the entity state of the second entity is acquired according to the second entity state foreign key.

That the fourth acquisition module acquires the corresponding relationship from the entity state of the second entity to the second entity may include: acquiring a second entity foreign key. The second entity foreign key may be a field stored in the entity state table, and the field may be the same preset field which associates the entity state of the second entity with the second entity. There may be one or more second entity foreign keys, the second entity foreign key points to the second entity in the entity table, and the corresponding relationship from the entity state of the second entity to the second entity is acquired according to the second entity foreign key.

In the embodiment of the present disclosure, the device may further include a third corresponding relationship acquisition unit. The third corresponding relationship acquisition unit may be configured to acquire a corresponding relationship from the indicator data to the Internet entity corresponding to the indicator data. The third corresponding relationship acquisition unit may acquire the corresponding relationship from the indicator data to the Internet entity corresponding to the indicator data in a manner of: acquiring an entity foreign key, the entity foreign key being a field stored in the indicator table. The field may be the same preset field which associates the indicator data with a current state of the corresponding Internet entity, and the entity foreign key points to the entity in the entity table. The corresponding relationship from the indicator data to the Internet entity corresponding to the indicator data may be acquired by acquiring the entity foreign key.

From the above, it can be seen that the present disclosure achieves technical effects as follows:

the client may obtain associations between the indicator data and the corresponding entities as well as all the corresponding entity states when analyzing the indicator data, so that the shortcoming that the indicator data may only be associated with the current state of the entity is overcome, and the effect of higher accuracy of a data analysis result is achieved.

It is important to note that the steps shown in the flowcharts of the drawings may be executed in a computer system, such as a group of computers, capable of executing instructions, and moreover, although there is shown a logic sequence in the flowcharts, the shown or described steps may be executed in a sequence different from the sequence described here under a certain condition.

Obviously, those skilled in the art should know that each module or step of the present disclosure may be implemented by a universal computing device, and the modules or steps may be concentrated on a single computing device or distributed on a network formed by multiple computing devices, and may optionally be implemented by program codes executable for the computing devices, so that the modules or steps may be stored in a storage device for execution with the computing devices, or may form each integrated circuit module, or multiple modules or steps therein may form a single integrated circuit module for implementation. As a consequence, the present disclosure is not limited to any specific hardware and software combination.

The above is only the preferred embodiment of the present invention and not intended to limit the present invention, and for those skilled in the art, the present invention may have various modifications and variations. Any modifications, equivalent replacements, improvements and the like within the spirit and principle of the present invention shall fall within the scope of protection of the present invention.

What is claimed is:

1. A data processing method for Internet entity analysis, comprising:

acquiring an entity state, the entity state being an entity state of an Internet entity, the entity state comprising a first entity state and a second entity state, the first entity state being an entity state of the Internet entity at first time and the second entity state being an entity state of the Internet entity at second time;

acquiring indicator data, the indicator data comprising first indicator data and second indicator data, the first indicator data being indicator data of the first entity state and the second indicator data being indicator data of the second entity state; and acquiring a corresponding relationship between the entity state and the indicator data, the corresponding relationship comprising a first corresponding relationship and a second corresponding relationship, the first corresponding relationship being a corresponding relationship between the first entity state and the first indicator data and the second corresponding relationship being a corresponding relationship between the second entity state and the second indicator data;

wherein the Internet entity comprises a first entity and a second entity, and the data processing method further comprises: acquiring a corresponding relationship between the first entity and an entity state of the first entity, and acquiring a corresponding relationship between the second entity and an entity state of the second entity, the Internet entity being stored in an entity table, the entity state being stored in an entity state table, and the entity table and the entity state table being database tables;

wherein acquiring the corresponding relationship between the first entity and the entity state of the first entity comprises: acquiring a corresponding relationship from the first entity to the entity state of the first entity, acquiring a corresponding relationship from the entity state of the first entity to the first entity, and wherein acquiring the corresponding relationship from the first entity to the entity state of the first entity is to acquire a corresponding relationship from the first entity to a current state of the first entity;

wherein acquiring the corresponding relationship from the first entity to the current state of the first entity comprises: acquiring a first entity state foreign key, the first entity state foreign key being a field stored in the entity table, the field being a same preset field which associates the first entity with the current state of the first entity and the first entity state foreign key pointing to the first entity state in the entity state table, and acquiring the corresponding relationship from the first entity to the entity state of the first entity according to the first entity state foreign key;

wherein acquiring the corresponding relationship from the entity state of the first entity to the first entity comprises: acquiring a first entity foreign key, the first entity foreign key being a field stored in the entity state table, the field being a same preset field which associates the entity state of the first entity with the first entity, there being one or more first entity foreign keys and the first entity foreign key pointing to the first entity in the entity table, and acquiring the corresponding relationship from the entity state of the first entity to the first entity according to the first entity foreign key;

wherein acquiring the corresponding relationship between the second entity and the entity state of the second entity comprises: acquiring a corresponding relationship from the second entity to the entity state of the second entity and acquiring a corresponding relationship from the entity state of the second entity to the second entity, and wherein acquiring the corresponding relationship from the second entity to the entity state of the second entity is to acquire a corresponding relationship from the second entity to a current state of the second entity;

wherein acquiring the corresponding relationship from the second entity to the current state of the second entity comprises: acquiring a second entity state foreign key, the second entity state foreign key being a field stored in the entity table, the field being a same preset field which associates the second entity with the current state of the second entity and the second entity state foreign key pointing to the second entity state in the entity state table, and acquiring the corresponding relationship from the second entity to the entity state of the second entity according to the second entity state foreign key; and wherein acquiring the corresponding relationship from the entity state of the second entity to the second entity comprises: acquiring a second entity foreign key, the second entity foreign key being a field stored in the entity state table, the field being a same preset field which associates the entity state of the second entity with the second entity, there being one or more second entity foreign keys and the second entity foreign key pointing to the second entity in the entity table, and acquiring the corresponding relationship from the entity state of the second entity to the second entity according to the second entity foreign key.

2. The data processing method for Internet entity analysis according to claim 1, wherein acquiring the entity state comprises:

detecting when the entity state changes; and
acquiring a latest entity state of the Internet entity when the entity state is detected to change.

3. The data processing method for Internet entity analysis according to claim 1, wherein the entity state is stored in the entity state table, the indicator data is stored in an indicator table, and the entity state table and the indicator table are database tables, wherein acquiring the corresponding relationship between the first entity state and the first indicator data comprises: acquiring a first entity state foreign key, the first entity state foreign key being a field stored in the indicator table, the field being a same preset field which associates the first indicator data with the first entity state and the first entity state foreign key pointing to the first entity state in the entity state table, and acquiring the corresponding relationship between the first entity state and the first indicator data according to the first entity state foreign key; and wherein acquiring the corresponding relationship between the second entity state and the second indicator data comprises: acquiring a second entity state foreign key, the second entity state foreign key being a field stored in the indicator table, the field being a same preset field which associates the second indicator data with the second entity state and the second entity state foreign key pointing to the second entity state in the entity state table, and acquiring the corresponding relationship between the second entity state and the second indicator data according to the second entity state foreign key.

4. The data processing method for Internet entity analysis according to claim 1, wherein the Internet entity is stored in the entity table, the entity state is stored in the entity state table, and the entity table and the entity state table are database tables, the method further comprising acquiring a corresponding relationship from the indicator data to the Internet entity corresponding to the indicator data.

5. The data processing method for Internet entity analysis according to claim 4, wherein acquiring the corresponding relationship from the indicator data to the Internet entity corresponding to the indicator data comprises:

acquiring an entity foreign key, the entity foreign key being a field stored in the indicator table, the field being the same preset field which associates the indicator data with a current state of the Internet entity corresponding to the indicator data, and the entity foreign key pointing to the Internet entity in the entity table and the indicator table being a database table; and acquiring the corresponding relationship from the indicator data to the Internet entity corresponding to the indicator data according to the entity foreign key.

6. A data processing device for Internet entity analysis, comprising:

an entity state acquisition unit configured to acquire an entity state, the entity state being an entity state of an Internet entity, the entity state comprising a first entity state and a second entity state, the first entity state being an entity state of the Internet entity at a first time, and the second entity state being an entity state of the Internet entity at a second time;

an indicator data acquisition unit configured to acquire indicator data, the indicator data comprising first indicator data and second indicator data, the first indicator data being indicator data of the first entity state and the second indicator data being indicator data of the second entity state;

a first corresponding relationship acquisition unit configured to acquire a corresponding relationship between the entity state and the indicator data, the corresponding relationship comprising a first corresponding relationship and a second corresponding relationship, the first corresponding relationship being a corresponding relationship between the first entity state and the first indicator data and the second corresponding relationship being a corresponding relationship between the second entity state and the second indicator data; and a second corresponding relationship acquisition unit;

wherein the Internet entity comprises a first entity and a second entity, wherein the second corresponding relationship acquisition unit comprises: a third acquisition module configured to acquire a corresponding relationship between the first entity and an entity state of the first entity, and a fourth acquisition module configured to acquire a corresponding relationship between the second entity and an entity state of the second entity, the Internet entity being stored in an entity table, the entity state being stored in an entity state table, and the entity table and the entity state table being database tables;

wherein the third acquisition module is configured to acquire the corresponding relationship between the first entity and the entity state of the first entity in a manner of acquiring a corresponding relationship from the first entity to the entity state of the first entity and acquiring a corresponding relationship from the entity state of the first entity to the first entity, and wherein acquiring the corresponding relationship from the first entity to the entity state of the first entity is to acquire a corresponding relationship from the first entity to a current state of the first entity;

wherein the third acquisition module is configured to acquire the corresponding relationship from the first entity to the current state of the first entity in a manner of: acquiring a first entity state foreign key, the first entity state foreign key being a field stored in the entity table, the field being a same preset field which associates the first entity with the current state of the first entity and the first entity state foreign key pointing to the first entity state in the entity state table, and acquiring the corresponding relationship from the first entity to the entity state of the first entity according to the first entity state foreign key;

wherein the third acquisition module is configured to acquire the corresponding relationship from the entity state of the first entity to the first entity in a manner of: acquiring a first entity foreign key, the first entity foreign key being a field stored in the entity state table, the field being a same preset field which associates the entity state of the first entity with the first entity, there being one or more first entity foreign keys and the first entity foreign key pointing to the first entity in the entity table, and acquiring the corresponding relationship from the entity state of the first entity to the first entity according to the first entity foreign key;

wherein the fourth acquisition module is configured to acquire the corresponding relationship between the second entity and the entity state of the second entity in a manner of: acquiring a corresponding relationship from the second entity to the entity state of the second entity and acquiring a corresponding relationship from the entity state of the second entity to the second entity, and wherein acquiring the corresponding relationship from the second entity to the entity state of the second entity is to acquire a corresponding relationship from the second entity to a current state of the second entity;

wherein the fourth acquisition module is configured to acquire the corresponding relationship from the second entity to the current state of the second entity in a manner of: acquiring a second entity state foreign key, the second entity state foreign key being a field stored in the entity table, the field being a same preset field which associates the second entity with the current state of the second entity and the second entity state foreign key pointing to the second entity state in the entity state table, and acquiring the corresponding relationship from the second entity to the entity state of the second entity according to the second entity state foreign key; and wherein the fourth acquisition module is configured to acquire the corresponding relationship from the entity state of the second entity to the second entity in a manner of: acquiring a second entity foreign key, the second entity foreign key being a field stored in the entity state table, the field being a same preset field which associates the entity state of the second entity with the second entity, there being one or more second entity foreign keys and the second entity foreign key pointing to the second entity in the entity table, and acquiring the corresponding relationship from the entity state of the second entity to the second entity according to the second entity foreign key.

7. The data processing method for Internet entity analysis according to claim 6, wherein the entity state acquisition unit comprises:
an entity state detection module configured to detect when the entity state changes; and
an entity state acquisition module configured to acquire a latest entity state of the Internet entity when the entity state is detected to change.

8. The data processing method for Internet entity analysis according to claim 6, wherein the entity state is stored in the entity state table, the indicator data is stored in an indicator table, the entity state table and the indicator table are database tables, and the first corresponding relationship acquisition unit comprises:
a first acquisition module configured to acquire the corresponding relationship between the first entity state and the first indicator data in a manner of: acquiring a first entity state foreign key, the first entity state foreign key being a field stored in the indicator table, the field being a same preset field which associates the first indicator data with the first entity state and the first entity state foreign key pointing to the first entity state in the entity state table, and acquiring the corresponding relationship between the first entity state and the first indicator data according to the first entity state foreign key; and
a second acquisition module configured to acquire the corresponding relationship between the second entity state and the second indicator data in a manner of: acquiring a second entity state foreign key, the second entity state foreign key being a field stored in the indicator table, the field being a same preset field which associates the second indicator data with the second entity state and the second entity state foreign key pointing to the second entity state in the entity state table, and acquiring the corresponding relationship between the second entity state and the second indicator data according to the second entity state foreign key.

9. The data processing device for Internet entity analysis according to claim 6, further comprising a third corresponding relationship acquisition unit configured to acquire a corresponding relationship from the indicator data to the Internet entity corresponding to the indicator data.

10. The data processing device for Internet entity analysis according to claim 9, wherein the third corresponding relationship acquisition unit acquires the corresponding relationship from the indicator data to the Internet entity corresponding to the indicator data in a manner of:
acquiring an entity foreign key, the entity foreign key being a field stored in the indicator table, the field being the same preset field which associates the indicator data with a current state of the Internet entity corresponding to the indicator data, and the entity foreign key pointing to the Internet entity in the entity table and the indicator table being a database table; and
acquiring the corresponding relationship from the indicator data to the Internet entity corresponding to the indicator data according to the entity foreign key.

* * * * *